US006800667B1

(12) United States Patent
Kreyenschmidt et al.

(10) Patent No.: US 6,800,667 B1
(45) Date of Patent: Oct. 5, 2004

(54) MIXTURE CONTAINING ISOCYANATES AS WELL AS ORGANIC AND/OR INORGANIC ACID ANHYDRIDES

(75) Inventors: Martin Kreyenschmidt, Worms (DE); Andreas Arlt, Winterlingen (DE); Reinhard Lorenz, Limburgerhof (DE); Ulrich Treuling, Bensheim (DE)

(73) Assignee: BASF Corporation, St. Olive, NJ (US)

( * ) Notice: Subject to any disclaimer, the term of this patent is extended or adjusted under 35 U.S.C. 154(b) by 0 days.

(21) Appl. No.: 09/763,280
(22) PCT Filed: Jul. 21, 1999
(86) PCT No.: PCT/EP99/05183
§ 371 (c)(1), (2), (4) Date: Feb. 20, 2001
(87) PCT Pub. No.: WO00/11059
PCT Pub. Date: Mar. 2, 2000

(30) Foreign Application Priority Data

Aug. 21, 1998 (DE) .......................................... 198 38 167

(51) Int. Cl.$^7$ .............................................. C08G 18/65
(52) U.S. Cl. .................... 521/129; 521/130; 252/182.2; 560/331
(58) Field of Search ....................... 252/182.2; 521/130; 521/129; 560/331

(56) References Cited

U.S. PATENT DOCUMENTS

| | | | |
|---|---|---|---|
| 3,373,122 A | * | 3/1968 | Porter et al. |
| 3,808,162 A | | 4/1974 | Allen et al. |
| 4,255,526 A | | 3/1981 | Yukuta et al. |
| 4,303,755 A | * | 12/1981 | Yukuta et al. |
| 4,347,345 A | * | 8/1982 | Blount ....................... 527/301 |
| 4,569,952 A | * | 2/1986 | Radovich et al. |
| 4,980,387 A | | 12/1990 | Wernsing et al. |
| 5,216,039 A | | 6/1993 | Lauri |
| 5,350,781 A | | 9/1994 | Liman et al. |
| 5,422,414 A | * | 6/1995 | Smith |
| 5,464,880 A | * | 11/1995 | Weber et al. |
| 5,731,361 A | | 3/1998 | Horn et al. |

FOREIGN PATENT DOCUMENTS

| | | |
|---|---|---|
| DE | 2350684 | 4/1974 |
| DE | A-2812256 | 10/1979 |
| DE | A-4232420 | 3/1994 |
| EP | A-657481 | 6/1995 |
| EP | A-711799 | 5/1996 |
| EP | A-896010 | 2/1999 |
| GB | A-1095922 | 12/1967 |
| GB | A-2196974 | 5/1988 |

OTHER PUBLICATIONS

G. Woods; ICI Polyurethanes Book; 1990; p. 64.*
PCT International Search Report Dated Oct. 29, 1999.
Abstract of JP 55106258. Aug. 1980.
Chem Abstract of DE 2812256.—Oct. 1979.
Chem Abstract of EP 896010.—Feb. 1999.

* cited by examiner

Primary Examiner—Rachel Gorr
(74) Attorney, Agent, or Firm—Fernando A. Borrego

(57) ABSTRACT

The present invention relates to a mixture that contains (i) at least one isocyanate and (ii) at least one organic and/or inorganic acid anhydride.

8 Claims, No Drawings

MIXTURE CONTAINING ISOCYANATES AS WELL AS ORGANIC AND/OR INORGANIC ACID ANHYDRIDES

Applicants hereby claim priority under 35 U.S.C. §119 to German Application No. 19838167.0, filed Aug. 21, 1998.

The present invention relates to mixtures comprising
(i) at least one isocyanate and
(ii) at least one organic and/or inorganic acid anhydride, preferably at least one carboxylic anhydride, where (ii) is preferably present in an amount of from 0.01 to 20% by weight, based on the weight of the mixture.

Furthermore, the invention relates to processes for producing polyisocyanate polyaddition products by reacting isocyanates with compounds which are reactive toward isocyanates in the presence or absence of catalysts, blowing agents, additives and/or auxiliaries, to polyisocyanate polyaddition products which can be produced in this way and to the use of the acid anhydrides according to the present invention in polyisocyanate polyaddition products.

The production of polyisocyanate polyaddition products by reacting polyisocyanates with compounds which are reactive toward isocyanates, catalysts which accelerate the reaction of the compounds which are reactive toward isocyanates with isocyanates and, if desired, blowing agents, additives and/or auxiliaries is generally known.

Like other plastics, polyisocyanate polyaddition products are subject to aging processes which, over the course of time, generally lead to impairment of the use properties. Significant aging influences are, for example, hydrolysis, photooxidation and thermal oxidation which lead to the rupture of bonds in the polymer chains. in the case of polyisocyanate polyaddition products, for example, polyurethane, the action of moisture and even more so the combination of moisture and heat results in hydrolytic cleavage of the urethane and urea bonds.

This cleavage not only shows up in a significant deterioration in the use properties but also leads to formation of primary aromatic amines such as toluenediamine (TDA) and diaminodiphenylmethane (MDA) or primary aliphatic amines such as hexamethylenediamine or isophoronediamine.

As has been determined in experiments, amine formation is influenced by a series of parameters. In particular, high temperatures above 80° C. combined with high atmospheric humidity lead to hydrolytic cleavage of the urethane and urea bonds. Such conditions are important for some specific applications of flexible PUR foams.

DE-A 42 32 420 discloses the use of $\alpha,\beta$-unsaturated ester carboxylates, which have been used as catalysts in addition to amines, for producing polyurethane foams which have improved compressive strength and elongation at break. The olefinic double bonds of the ester carboxylates are said to remove amines by addition onto the double bond. U.S. Pat. No. 4,255,526 describes the use of amino acids in the production of polyurethane foams to increase the stability toward moisture and heat.

Disadvantages of these known teachings is that the materials used are relatively expensive and, in addition, according to the prior art are not added until the production of the polyisocyanate polyaddition products. It has hitherto not been possible to develop hydrolysis stabilizers which do not develop their activity until after the processing stage. In the majority of cases, the materials used hitherto enter directly into the course of the reaction in the processing of isocyanates and compounds which are reactive toward isocyanates, alter the reactivity of these components toward one another and make further system modification unavoidable. The catalyst-acid complexes described in DE-A 23 50 684 are likewise added to the starting components in the production of polyurethanes. An addition of a hydrolysis stabilizer which does not influence the reactivity of the system during the processing stage and is added via the isocyanate component is not known.

EP-A 711 799 describes the production of polyurethane moldings having a cellular core and a compacted surface zone which are produced in the presence of polymeric carboxylic acids or their derivatives, with the polymers being added to the component which is reactive toward isocyanates. The object of that document was to replace chlorofluorocarbons as blowing agents and to produce moldings having an improved skin. The problem of the aging processes in polyurethanes is not addressed in this document.

In the production of polyurethane systems, use is frequently made of catalysts, for example organic amines, which, in the production of polyurethane foams, preferably accelerate both the blowing reaction, i.e. the reaction of the isocyanate groups with, for example, water to form carbon dioxide and also the crosslinking reaction between alcoholic hydroxyl groups and isocyanates to form urethane groups. To improve the flow and curing of reaction mixtures, it can be advantageous, particularly in the production of foamed polyurethanes, to use the amines in a form which is blocked by salt formation with an organic acid, customarily formic, acetic or ethylhexanoic acid. During the polyisocyanate polyaddition reaction, the catalysts which are blocked in a thermally reversible way decompose under the action of the heat of reaction, the catalytically active amine is set free and the crosslinking—or foaming reaction commences at an increased rate only after sufficient cream and rise times of the reaction mixture. Catalysts of this type are described in DE-A 28 12 256.

A disadvantage of this use of delayed-action catalysts is that these catalysts are used in an equimolar ratio of basic catalyst to blocking acid and, after catalysis has taken place, the catalyst is present in unblocked form in the polyisocyanate polyaddition product. It should also be noted that the catalysts are usually blocked by means of volatile acids and the latter vaporize from the system as a result of the high temperatures during the processing stage and are no longer available for blocking the catalyst. Furthermore, in the majority of cases it is not possible to use only blocked catalysts because otherwise the reaction becomes too slow, so that the total amount of catalyst remaining in the system is never blocked and very large proportions of free catalyst can catalyze the cleavage of urethane groups.

It is an object of the present invention to develop a mixture which, in the polyisocyanate polyaddition reaction, leads to products having an improved stability to aging processes, in particular to hydrolysis. A further object is to develop a stabilizer which makes it possible to suppress hydrolysis in polyether urethanes and thus also prevent aromatic amines from being liberated.

We have found that this object is achieved by the mixtures described at the outset, which can be advantageously used as components in the production of polyisocyanate polyaddition products.

It was surprisingly found that an amine catalyst present in the production of polyisocyanate polyaddition products not only catalyzes the polyaddition reaction, i.e. accelerates the formation of urethane groups, but also, after the polyaddition reaction is complete, catalyzes the cleavage of the urethane bonds to an increased degree. This applies particularly when the polyisocyanate products are stored under moist and warm conditions and is made worse by the fact that the catalyst, after the production of the polyisocyanate polyaddition products, the catalyst is present in unblocked and therefore active form and catalyzes the redissociation. The cleavage of the urethane bond leads not only to impairment of the properties of the polyisocyanate polyaddition products but can also lead to the formation of amines which are undesirable.

As a result of the use according to the present invention of (ii) at least one acid anhydride, the anhydrides in the polyisocyanate polyaddition products are hydrolyzed to the acids especially under moist and warm conditions. These acids formed after hydrolysis block any amine catalysts present in the products, for example by protonation or reaction, and thus effectively prevent redissociation of the urethane and/or urea bonds under the abovementioned conditions. In addition, any free amino groups formed by undesired cleavage of urethane and/or urea bonds are bound by reaction with the acids anhydrides according to the present invention.

The acid anhydrides are thus used in polyisocyanate polyaddition products for stabilizing the polyisocyanate polyaddition products, for example urethane and/or urea bonds, in particular polyurethanes, against cleavage of the urethane and urea bonds, for example by blocking amine catalysts by protonation of the catalysts or by reaction with the catalysts. In addition, the acid anhydrides can be used in polyisocyanate polyaddition products for reacting with amino groups in the polyisocyanate polyaddition products, for example to form amides.

The diffusion of amines from the polyisocyanate polyaddition products and the redissociation of the urethane bond, for example due to amine catalysts present in the polyisocyanate polyaddition products, can thus be prevented according to the invention.

It has surprisingly been found that acid anhydrides which are used in the production of polyisocyanate polyaddition products survive the production process virtually unscathed and do not participate significantly in the reaction. This applies particularly when the acid anhydrides are used in admixture with isocyanates, since this component is usually free of water and hydrolysis of the anhydrides can therefore be avoided.

Surprisingly, it has been established that the acid anhydrides in admixture with isocyanates are stable at room temperature, i.e. 250° C., and the isocyanate groups do not react significantly, if at all, with the anhydride groups.

The acid anhydrides according to the present invention, preferably the mixtures of the present invention, can be advantageously used for producing polyisocyanate polyaddition products by generally known methods by reacting isocyanates with compounds which are reactive toward isocyanates in the presence or absence of catalysts, blowing agents, additives and/or auxiliaries. Examples of polyisocyanate polyaddition products which can be produced by conventional methods using the mixtures of the present invention are compact or cellular, for example, microcellular, flexible, semirigid or rigid polyurethane foams, thermoplastic polyurethanes or polyurethane elastomers. The mixtures of the present invention are preferably used in processes for producing polyurethane elastomers or foamed polyisocyanate polyaddition products, in particular flexible polyurethane foams, by reacting isocyanates with compounds which are reactive toward isocyanates in the presence of catalysts, blowing agents, additives and/or auxiliaries.

The present teachings are extraordinarily advantageous for, in particular, foams exposed to hot and humid conditions (hot steam disinfection, or, in the future, sterilization of hospital mattresses, hot steam cleaning of upholstered furniture and carpets).

The formation of primary aromatic amines such as toluenediamine or diaminodiphenylmethane associated with a cleavage reaction of the polyurethane is likewise significantly reduced thereby. The stabilizing action is advantageously based on preventing the formation of primary amines. The acid anhydrides used according to the present invention counter not only a deterioration in the mechanical properties, particularly under hot and humid conditions, but also the formation of primary amines, in particular primary aromatic amines such as 2,2'-, 2,4'- and/or 4,4'-MDA and/or 2,4- and/or 2,6-TDA.

Particular preference is given to using the acid anhydrides in processes for producing flexible polyurethane foams having a density of from 15 to 300 kg/m$^3$, preferably from 20 to 70 kg/m$^3$, in particular mattresses and/or upholstery for furniture and/or carpets, in particular hospital mattresses, by reacting isocyanates with compounds which are reactive toward isocyanates in the presence of catalysts, blowing agents and, if desired, additives and/or auxiliaries. These products, i.e. particularly the upholstery for furniture and/or carpets and/or the mattresses, are increasingly treated with hot steam for cleaning or disinfection, so that it is precisely these products, which are particularly preferred according to the present invention, in which the advantages of the present invention are particularly pronounced. In the process of the present invention, (ii) is preferably used in an amount of from 0.01 to 20% by weight, particularly preferably from 0.1 to 6% by weight, in each case based on the total weight of (i) and (ii).

Examples of isocyanates which are suitable for use in the mixtures of the present invention are the compounds described below:

Isocyanates which can be used are the aliphatic, cycloaliphatic, araliphatic and preferably aromatic organic isocyanates, preferably polyfunctional isocyanates, particularly preferably diisocyanates, known per se.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates, such as cyclohexane 1,3- and -1,4-diisocyanate and also any mixtures of these isomers, 1-isocyanato-3,3,5-trimethyl-5-isocyanatomethylcyclohexane (isophorone diisocyanate), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, aromatic diisocyanates and polyisocyanates such as tolylene 2,4- and 2,6-diisocyanate (TDI) and the corresponding isomer mixtures, diphenylmethane 4,4'-, 2,4'- and 2,2'-diisocyanate (MDI) and the corresponding isomer mixtures, naphthalene 1,5-diisocyanate (NDI), mixtures of diphenylmethane 4,4'- and 2,4'-diisocyanates, mixtures of NDI and diphenylmethane 4,4'- and/or 2,4'-diisocyanates, 3,3'-dimethyl-4,4,-diisocyanatobiphenyl (TODI), mixtures of TODI and diphenylmethane 4,4'- and/or 2,4'-diisocyanates, polyphenyl-polymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of mixtures.

Use is frequently also made of modified polyfunctional isocyanates, i.e. products which are obtained by chemical reaction of organic diisocyanates and/or polyisocyanates.

Examples which may be mentioned are diisocyanates and/or polyisocyanates containing ester, urea, biuret, allophanate, carbodiimide, isocyanurate, uretdione and/or urethane groups. Specific examples of suitable products are: organic, preferably aromatic polyisocyanates containing urethane groups and having NCO contents of from 33.6 to 15% by weight, preferably from 31 to 21% by weight, based on the total weight, modified diphenyl-methane 4,4'-diisocyanate, modified diphenylmethane 4,4'- and 2,4'-diisocyanate mixtures, modified NDI, modified TODI, modified crude MDI and/or tolylene 2,4- or 2,6-diisocyanate, with examples of dialkylene or polyoxyalkylene glycols which can be used individually or as mixtures being: diethylene glycol, dipropylene glycol, polyoxyethylene, polyoxypropylene and polyoxypropylene-polyoxyethylene glycols, triols and/or tetrols. Also suitable are prepolymers containing NCO groups, having NCO contents of from 25 to 3.5% by weight, preferably from 21 to 14% by weight, based on the total weight, and prepared from, for example, polyester polyols and/or preferably polyether polyols and diphenylmethane 4,4'-diisocyanate, mixtures of diphenylmethane 2,4'- and 4,4'-diisocyanate, NDI, TODI, mixtures of NDI and isomers of MDI, tolylene 2,4- and/or 2,6-diisocyanates or crude MDI. Further modified isocyanates which have been found to be useful are liquid polyisocyanates containing carbodiimide groups and/or isocyanurate rings and having NCO contents of from 33.6 to 15% by weight, preferably from 31 to 21% by weight, based on the total weight, e.g. those based on diphenylmethane 4,4'-, 2,4'- and/or 2,2'-diisocyanate, NDI, TODI and/or tolylene 2,4- and/or 2,6-diisocyanate.

The modified polyisocyanates can, if desired, be mixed with one another or with unmodified organic polyisocyanates such as diphenylmethane 2,4'- and/or 4,4'-diisocyanate, NDI, TODI, crude MDI, tolylene 2,4- and/or 2,6-diisocyanate.

As isocyanates used in the mixtures or processes of the present invention, preference is given to using diphenyl-methane 4,4'-, 2,4'- and/or 2,2'-diisocyanate, tolylene 2,4- and/or 2,6-diisocyanate, NDI, hexamethylene diisocyanate and/or isophorone diisocyanate, where these isocyanates can be used either in any mixtures or in modified form as described above.

However, the effectiveness of these anhydrides is in principle independent of the isocyanate used.

As compounds which are reacted toward isocyanates and usually have at least two reactive hydrogen atoms, usually hydroxyl and/or amino groups, use is advantageously made of those having a functionality of from 2 to 8, preferably from 2 to 6, and a molecular weight of usually from 60 to 10,000. Compounds which have been found to be useful are, for example, polyether polyamines, and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols which can be prepared by known methods.

The polyester polyols preferably have a functionality of from 2 to 4, in particular from 2 to 3, and a-molecular weight of usually from 500 to 3,000, preferably from 1,200 to 3,000 and in particular from 1,800 to 2,500.

The polyether polyols have a functionality of preferably from 2 to 6 and usually have molecular weights of from 500 to 8,000.

Suitable polyether polyols also include, for example, polymer-modified polyether polyols, preferably graft polyether polyols, in particular those based on styrene and/or acrylonitriles which can be prepared by in situ polymerization of acrylonitrile, styrene or preferably mixtures of styrene and acrylonitrile.

Like the polyester polyols, the polyether polyols can be used individually or in the form of mixtures. They can also be mixed with the graft polyether polyols or polyester polyols or with hydroxyl-containing polyester amides, polyacetals, polycarbonates and/or polyetherpolyamines.

Polyol components used for rigid polyurethane foams, which may contain isocyanurate structures, are high-functionality polyols, in particular polyether polyols based on high-functionality alcohols, sugar alcohols and/or saccharides as initiator molecules, while 2- and/or 3-functional polyether polyols and/or polyester polyols based on glycerol and/or trimethylolpropane and/or glycols as initiator molecules or alcohols to be esterified are used for flexible foams. The polyether polyols are prepared by a known technology. Suitable alkylene oxides for preparing the polyols are, for example, tetrahydrofuran, 1,3-propylene oxide, 1,2- or. 2,3-butylene oxide, styrene oxide and preferably ethylene oxide and 1,2-propylene oxide. The alkylene oxides can be used individually, alternately in succession or as mixtures. Preference is given to using alkylene oxides which lead to primary hydroxyl groups in the polyol. Particular preference is given to using polyols which have been alkoxylated with ethylene oxide at the end of the alkoxylation and thus have primary hydroxyl groups. For producing thermoplastic polyurethanes, preference is given to using polyols having a functionality of from 2 to 2.2 and no crosslinker.

As compounds which are reactive toward isocyanates, it is also possible to use chain extenders and/or crosslinkers. The addition of chain extenders, crosslinkers or, if desired, mixtures thereof can prove to be advantageous, for example, for modifying the mechanical properties, e.g. the hardness, of the polyisocyanate polyaddition products produced using these substances. As chain extenders and/or crosslinkers, it is possible to use water, diols and/or triols having molecular weights of from 60 to <500, preferably from 60 to 300. Examples of suitable chain extenders/crosslinkers are aliphatic, cycloaliphatic and/or araliphatic diols having from 2 to 14, preferably from 4 to 10, carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane and low molecular weight hydroxyl-containing polyalkylene oxides based on ethylene oxide and/or 1,2-propylene oxide and diols and/or triols as initiator molecules.

If chain extenders, crosslinkers or mixtures thereof are employed for producing the polyisocyanate polyaddition products, they are advantageously used in an amount of from 0 to 20% by weight, preferably from 2 to 8% by weight, based on the weight of the compounds which are reactive toward isocyanates. Thermoplastic polyurethanes are preferably produced without using crosslinkers.

As (ii), it is possible to use organic or inorganic acid anhydrides, for example including polyanhydrides, preferably carboxylic anhydrides, for example anhydrides of aliphatic, cycloaliphatic, araliphatic and/or aromatic carboxylic acids usually having from 1 to 10, preferably 1 or 2, carboxyl groups; mixed anhydrides can also be prepared on the basis of at least two different carboxylic acids. Anhydrides used can also include polyanhydrides which are obtainable from dicarboxylic and/or polycarboxylic acids, or copolymers of anhydrides and a wide variety of alkenes. Preferably, the carboxyl groups of the compounds are largely, particularly preferably completely, converted into the corresponding anhydrides. The compounds (ii) usually have a molecular weight of from 60 to 1,000,000. Examples which may be mentioned are: acetic anhydride, propionic anhydride, butyric anhydride, pentanoic anhydride, hexanoic anhydride, heptanoic anhydride, octanoic anhydride, dimethylolpropionic anhydride, adipic anhydride, fumaric anhydride, mesaconic anhydride, methylenemalonic anhydride, trimellitic anhydride, ethylene glycol 4,4'-bis(anhydro-trimellitate), 2-acetyl-1,3-glycerol 4,4'-bis(anhydro-trimellitate), decanedioic anhydride, dodecanedioic anhydride, azelaic anhydride, pimelic anhydride, brassylic anhydride, citraconic anhydride, itaconic anhydride, naphthalene-1,8-dicarboxylic anhydride, naphthalene-1,2-dicarboxylic anhydride, chlorendic anhydride, 1,2,3,6-tetrahydrophthalic anhydride, mellophanic anhydride, benzene-1,2,3,4-tetracarboxylic anhydride, benzene-1,2,3-tricarboxylic anhydride, benzoic anhydride, biphenyl-3,3'-4,4'-tetracarboxylic anhydride, biphenyl-2,2'-3,3'-tetracarboxylic anhydride, naphthalene-2,3,6,7-tetracarboxylic anhydride, naphthalene-1,2,4,5-tetracarboxylic anhydride, naphthalene-1,4,5,8-tetracarboxylic anhydride, decahydronaphthalene-1,4,5,8-tetracarboxylic anhydride, 4,8-dimethyl-1,2,3,5,6,7-hexahydronaphthalene-1,2,5,6-tetracarboxylic anhydride, 2,6-dichloronaphthalene-1,4,5,8-tetracarboxylic anhydride, 2,7-dichloronaphthalene-1,4,5,8-tetracarboxylic anhydride, 2,3,6,7-tetrachloronaphthalene-1,4,5,8-tetracarboxylic anhydride, phenanthrene-1,3,9,10-tetracarboxylic anhydride, perylene-3,4,9,10-tetracarboxylic anhydride, bis(2,3-dicarboxyphenyl)methane anhydride, bis(3,4-dicarboxyphenyl)methane anhydride, 1,1-bis(2,3-dicarboxy-phenyl)ethane anhydride, 1,1-bis(3,4-dicarboxyphenyl)ethane anhydride, 2,2-bis(2,3-dicarboxyphenyl)propane anhydride, 2,2-bis(3,4-dicarboxyphenyl)propane anhydride, bis(3,4-dicarboxyphenyl)sulfonic anhydride, bis(3,4-dicarboxyphenyl)ether anhydride, ethylenetetracarboxylic anhydride, butane-1,2,3,4-tetracarboxylic anhydride, cyclopentane-1,2,3,4-tetracarboxylic anhydride, pyrrolidine-2,3,4,5-tetracarboxylic anhydride, pyrazine-2,3,5,6-tetracarboxylic anhydride, mellitic anhydride, thiophene-2,3,4,5-tetracarboxylic anhydride, benzophenone-3,3',4,4'-tetracarboxylic anhydride, maleic anhydride, glutaric anhydride, pyromellitic anhydride, phthalic anhydride, isophthalic anhydride and/or terephthalic anhydride, benzoic anhydride, phenylacetic anhydride, cyclohexylalkanoic anhydrides, malonic anhydride, succinic anhydride, polymaleic anhydride, anhydrides based on adducts of maleic acid and styrene, dodecenylsuccinic anhydride, anhydrides of maleic acid and any alkylenes, e.g. n-octylenesuccinic anhydride, n-dodecylenesuccinic anhydride and/or copolymers of anhydrides and any further comonomers such as isobutene and maleic anhydride, poly(ethylene-co-butyl acrylate-co-maleic dianhydride) and/or poly(styrene-co-maleic anhydride), where the respective diacids or polyacids are partially or preferably completely in the form of anhydrides. In the case of the diacids or polyacids, the corresponding anhydrides can, insofar as it is stearically possible, be both intermolecular or intramolecular.

As comonomers which are copolymerizable with the unsaturated carboxylic acids or carboxylic anhydrides, it is also possible to use, for example, the following:

Olefins such as ethylene, propylene, n-butylene, isobutylene, n-octylene, n-dodecylene and diisobutene, vinyl alkyl ethers such as vinyl methyl ether, vinyl ethyl ether, vinyl propyl ether, vinyl isopropyl ether, vinyl butyl ether, vinyl isobutyl ether and vinyl tert-butyl ether, vinylaromatics such as styrene and α-methylstyrene, furan and 2-methylfuran, diketene, acrylic and methacrylic acid derivatives, e.g. (meth)acrylamide, (meth)acrylonitrile, alkyl (meth)acrylates such as methyl (meth)acrylate, ethyl (meth)acrylate, propyl (meth)acrylate, butyl (meth)acrylate, isobutyl (meth)acrylate and tert-butyl (meth)acrylate, hydroxyalkyl (meth)acrylates such as hydroxyethyl (meth)acrylate, hydroxypropyl (meth)acrylate, hydroxybutyl (meth)acrylate and hydroxyisobutyl (meth)acrylate, vinyl esters of carboxylic acids, e.g. vinyl formate, vinyl acetate, vinyl butyrate and vinylpivalate and other vinyl-containing monomers such as N-vinylpyrrolidone, N-vinylcaprolactam, N-vinylformamide, N-vinylacetamide, N-vinylmethylacetamide and N-vinylimidazole.

As (ii), preference is given to using anhydrides based on the following compounds: pyromellitic acid, citraconic acid, itaconic acid, phthalic, isophthalic and/or terephthalic acid, benzoic acid, phenyl acetic acid, cyclohexylalkanoic acid, malonic acid, adducts of maleic acid with styrene and/or of maleic acid and alkylenes, for example the above-described comonomers, succinic acid, maleic acid, polymaleic acid, glutaric acid and/or copolymers of the above-mentioned unsaturated acids with comonomers which are copolymerizable with these acids.

Particular preference is generally given to those anhydrides which dissolve readily in (i).

In the mixtures of the present invention, (ii) is preferably present in amounts of from 0.01 to 20% by weight, particularly preferably from 0.1 to 6% by weight, in each case based on the weight of the mixture.

In addition to (i) and (ii), the mixtures can further comprise blowing agents, additives, auxiliaries and/or catalysts, for example those which accelerate the reaction of the materials which are reactive toward isocyanates with isocyanates, for example the blowing and/or crosslinking reaction.

As blowing agents, it is possible to use, if desired, preferably for producing foamed polyurethanes, generally known blowing agents such as materials which have a boiling point under atmospheric pressure in the range from −40° C. to 120° C., gases and/or solid blowing agents and/or water in customary amounts, for example carbon dioxide, alkanes and/or cycloalkanes, e.g. isobutane, propane, n- or iso-butane, n-pentane and cyclopentane, ethers such as diethyl ether, methyl isobutyl ether and dimethyl ether, nitrogen, oxygen, helium, argon, nitrous oxide, halogenated hydrocarbons and/or partially halogenated hydrocarbons such as trifluoromethane, monochlorotrifluoroethane, difluoroethane, pentafluoroethane, tetrafluoroethane or mixtures comprising at least two of the blowing agents mentioned by way of example.

Examples of auxiliaries and/or additives are surface-active substances, foam stabilizers, cell regulators, fillers, dyes, pigments, flame retardants, hydrolysis inhibitors, fungistatic and bacteriostatic substances.

Suitable catalysts are generally customary compounds, for example organic amines such as triethylamine, triethylenediamine, tributylamine, dimethylbenzylamine, N,N,N',N'-tetramethyl-ethylenediamine, N,N,N',N'-tetramethylbutanediamine, N,N,N',N'-tetramethylhexane-1,6-diamine, dimethylcyclohexylamine, pentamethyldipropylenetriamine, pentamethyldiethylenetriamine, 3-methyl-6-dimethylamino-3-azapentol, dimethylaminopropylamine, 1,3-bisdimethylaminobutane, bis(2-dimethylaminoethyl) ether, N-ethylmorpholine, N-methylmorpholine, N-cyclohexylmorpholine, 2-dimethylaminoethoxyethanol, dimethylethanolamine, tetramethylhexamethylenediamine, dimethylamino-N-methyl-ethanolamine, N-methylimidazole, N-formyl-N,N'-dimethylbutylene-diamine, N-dimethylaminoethylmorpholine, 3,3,-bisdimethylaminodi-n-propylamine and/or bis(2-piperazinoisopropyl)ether, dimethylpiperazine, N,N'-bis(3-aminopropyl)ethylenediamine and/or tris(N,N-dimethylaminopropyl)-s-hexahydrotriazine, or mixtures comprising at least two of the amines mentioned, where relatively high molecular weight tertiary amines as are described, for example, in DE-A 28 12 256, are also possible. Further catalysts which can be used for this purpose are customary organic metal compounds, preferably organic tin compounds such as tin(II) salts of organic carboxylic acids, e.g. tin(II) acetate, tin(II) octoate, tin(II) ethylhex-anoate and tin(II) laurate, and the dialkyltin(IV) salts of organic carboxylic acids, e.g. dibutyltin diacetate, dibutyltin dilaurate, dibutyltin maleate and dioctyltin diacetate. Tertiary aliphatic and/or cycloaliphatic amines are preferably present in the mixtures, particularly preferably triethylenediamine.

The mixtures of the present invention are preferably used for producing polyisocyanate polyaddition products, for example compact or cellular, for example microcellular, thermoplastic or crosslinked, rigid, semirigid or flexible, elastic or inelastic polyurethanes.

The starting materials for producing the polyisocyanate polyaddition products have already been described by way of example. Usually, the organic polyisocyanates and the compounds which are reactive toward isocyanates and have a molecular weight of from 60 to 10,000 g/mol are reacted in such amounts that the equivalence ratio of NCO groups of the polyisocyanates to the sum of the reactive hydrogen atoms of the compounds which are reactive toward isocyanates is 0.5–5:1, preferably 0.9–3:1 and in particular 0.95–2:1.

It may be advantageous for the polyurethanes to contain at least some bound isocyanurate groups. In this case, preference is given to using a ratio of NCO groups of the polyisocyanates to the sum of the reactive hydrogen atoms of 1:5–60:1, preferably 1:5–8:1.

The polyisocyanate polyaddition products can be produced, for example, by the one-shot process or by the known prepolymer process, for example by means of the high-pressure or low-pressure technique in open or closed molds, reaction extruders or belt units.

The mixtures of the present invention are preferably used to produce foamed polyisocyanate polyaddition products, for example foamed polyurethanes and/or polyisocyanurates.

It has been found to be advantageous to produce the polyisocyanate polyaddition products by the two-component method and to combine the compounds which are reactive toward isocyanates and, if desired, the catalysts, blowing agents and/or auxiliaries and/or additives to form the A component and to use the isocyanates and catalysts and/or blowing agents as B component. The acid anhydrides used according to the present invention are added to the B component. If the anhydride is incorporated in the A component, it is possible to achieve only a limited component life without the system parameters changing, since the amine catalysts and the water present in this component contribute to hydrolysis of the anhydride and thus reduce the activity of the catalysts even before the systems are processed. In the process of the present invention for producing the polyisocyanate polyaddition products, the acid anhydrides (ii) are preferably used in an amount of from 0.1 to 20% by weight, particularly preferably from 0.1 to 6% by weight, based on the weight of the sum of the acid anhydrides and the isocyanates used.

The invention is illustrated by the following examples.

Flexible polyurethane foams were produced using the following formulation and in the individual examples the amounts of acid anhydrides indicated in Table 1 were added to the isocyanate component (B component) prior to mixing with the polyol component (A component). For comparison, foams were produced without addition of acid anhydrides.

A component 97 parts by weight of a polyether polyalcohol having a hydroxyl number of 28 mg KOH/g, a mean functionality of 2.3 and prepared using an ethylene oxide to propylene oxide ratio of 14:86,
3 parts by weight of a polyether polyalcohol having a hydroxyl number of 42 mg KOH/g, a mean functionality of 3 and prepared using an ethylene oxide to propylene oxide ratio of 30:70,
3.31 parts by weight of water,
0.8 part by weight of aminopropylimidazole,
0.6 part by weight of dimethylamino diglycol and
0.5 part by weight of a stabilizer (Tegostab ® B 8631, Goldschmidt)

B component

Mixture of a polymeric MDI (proportion by weight: 50%) and a bifunctional MDI mixture (proportion by weight: 50%) having an NCO content of 32.7%.

TABLE 1

| Example | Compound (ii), % by weight in B component |
|---|---|
| 1 | maleic anhydride, 1.0% by weight |
| 2 | pyromellitic anhydride, 2.0% by weight |
| 3 | succinic anhydride, 2.0% by weight |
| 4 | polymaleic anhydride having a mean molecular weight of from 400 to 500, 1.2% by weight |
| 5 | poly(methyl vinyl ether - alternating with - maleic anhydride) having an average molecular weight of 216,000, 0.7% by weight |
| 6 | glutaric anhydride, 1.9% by weight |
| 7 | dodecenylsuccinic anhydride, 4.3% by weight |
| 8 | polytetramethylene ether glycol end-capped with trimellitic anhydride, 2.3% by weight |
| 9 | maleic anhydride-butadiene copolymer, 5.0% by weight |

The flexible foams were produced by mixing 750 g of A component with 393 g of B component at room temperature in a 5 l bucket at an index of 100 using a stirrer, pouring the foaming mixture when the cream time had been reached into an aluminum mold having the dimensions 40×40×10 cm and heated to 53° C., closing the mold and taking the flexible foam from the mold after the gel time had been reached.

The mechanical properties of the polyurethane foams produced according to the present invention were examined immediately after they had been produced and after storage for 3 days at 90° C. and 90% relative atmospheric humidity and compared with those of flexible foams which had been produced using the A and B components indicated but without addition of compounds as shown in Table 1 (comparison). The excellent properties, in particular the significantly increased stability, of the foams of the present invention can be seen in Table 2.

TABLE 2

| Example | CS | RR | Compressive strength | Tensile strength | Elongation |
|---|---|---|---|---|---|
| Comparison w.o.s. | 4.1 | 68.5 | 5.1 | 95 | 96 |
| Comparison wi.s. | 15.6 | 49.3 | 3.8 | 59 | 105 |
| 1 w.o.s. | 3.6 | 69.7 | 4.9 | 88 | 84 |
| 1 wi.s. | 5.6 | 64.3 | 5.1 | 71 | 79 |
| 2 w.o.s. | 4.7 | 68.0 | 4.9 | 88 | 95 |
| 2 wi.s. | 6.1 | 61.0 | 4.1 | 79 | 105 |
| 3 w.o.s. | 4.3 | 72.7 | 5.6 | 88 | 85 |
| 3 wi.s. | 5.7 | 65.2 | 4.5 | 101 | 104 |
| 4 w.o.s. | 3.9 | 70.6 | 5.1 | 91 | 91 |
| 4 wi.s. | 5.9 | 63.5 | 3.9 | 88 | 101 |
| 5 w.o.s. | 5.1 | 67.8 | 4.7 | 88 | 91 |
| 5 wi.s. | 7.3 | 60.5 | 4.4 | 76 | 99 |
| 6 w.o.s. | 3.3 | 69.7 | 4.6 | 93 | 96 |
| 6 wi.s. | 5.7 | 63.5 | 3.8 | 76 | 96 |
| 7 w.o.s. | 3.4 | 68.9 | 4.6 | 81 | 85 |
| 7 wi.s. | 7.3 | 59.9 | 3.8 | 70 | 94 |
| 8 w.o.s. | 3.9 | 68.9 | 6.3 | 91 | 86 |
| 8 wi.s. | 5.7 | 64.0 | 4.9 | 76 | 86 |
| 9 w.o.s. | 3.9 | 70.4 | 5.5 | 93 | 89 |
| 9 wi.s. | 5.2 | 65.3 | 4.1 | 76 | 88 | w.o.s.: without storage
wi.s.: with storage
CS: compressive set, in [%], measured in accordance with DIN 53572
RR: rebound resilience, in [%], measured in accordance with DIN 53573
Compressive strength: in [kPa], measured in accordance with DIN 53577 at 40% deformation
Tensile strength: in [kPa], measured in accordance with DIN 53571
Elongation: in [%], measured in accordance with DIN 53571

The surprising advantages of the present invention will also be shown by way of example for the production of polyurethane shoe soles.

An important quality criterion for polyether urethane shoe systems is the cyclic flexure performance. The cyclic flexure performance is tested by the following method: a 2 mm wide stab is cut into an appropriate polyurethane molding or a shoe sole and the material is then subjected to the flexural test. This specifies that the material must experience a crack widening of no more than 4 mm when flexed 100,000 times through 90° at a frequency of 150 flexures/minute in order to pass the test. In addition, the system also has to pass the flexural test after having been subjected to hydrolytic aging. The test is made more severe by the cyclic flexure test having to be passed in an index range extending from before to after hydrolysis.

Test specimens were produced using the following formulations, which can usually be used for producing polyurethane shoe soles, and their cyclic flexure performance was examined before and after aging.

A component 30 parts by weight of a trifunctional polyether polyol based on propylene oxide with an ethylene oxide end block of 21% and having an OH number of 26 mg KOH/g and a mean functionality of 3;
   57.3 parts by weight of a bifunctional polyether polyol based on propylene oxide with an ethylene oxide end block of 19% and having an OH number of 28 mg KOH/g and a mean functionality of 2;
   7.5 parts by weight of 1,4-butanediol;
   4.5 parts by weight of a 25% strength solution of Dabco in 1,4-butanediol;
   0.2 part by weight of tin catalyst;
   0.47 part by weight of water.

B component

Prepolymer (96% by weight) having an NCO content of 20.5% and obtained by reaction of 4,4'-MDI (76% by weight), a polymeric MDI (4% by weight), a bifunctional polyol (14% by weight) having a hydroxyl number of 104 mg KOH/g based on propylene oxide and dipropylene glycol (5%) and also 4% by weight of alkylsuccinic anhydride.

The test specimens for comparison were produced using a B component which contains 100% of the prepolymer and no acid anhydride.

The polyurethane test specimens were produced by mixing the A component at 25° C. in an EMB low-pressure Puromat with the B component at a mass ratio (MR) of A component to B component as shown in Table 3, pouring the foaming mixture into an aluminum mold having the dimensions 20×20×1 cm and heated to 45° C., closing the mold and removing the microcellular foam (the foamed elastomer) after 4.5 minutes of the gel time.

The mechanical properties of the polyurethane moldings produced according to the present invention were examined after 1 day of storage and after-reaction at room temperature and after storage for 7 days at 70° C. and 100% relative atmospheric humidity and compared to those of cellular elastomers which had been produced using the A and B components indicated without addition of compounds as shown in Table 1 (Comparison). The excellent properties, in particular the significantly improved cyclic flexure performance, of the foams of the present invention can be seen in Table 3.

TABLE 3

| Example | % by weight of anhydride in B | MR A:B = 100: | Cyclic flexure properties before storage | Cyclic flexure properties after storage |
|---|---|---|---|---|
| Comparison | 0 | 90 | 6.8; 5.5; 7.0; 7.8 | 10 000 rupture |
| Comparison | 0 | 92 | 5.3; 6.2; 4.5; 4.8 | 50 000 rupture |
| Comparison | 0 | 95 | 60 000 rupture | 5.4; 8.0; 7.2; 5.0 |
| Comparison | 0 | 98 | 40 000 rupture | 6.0; 5.5; 5.9; 5.7 |
| Comparison | 0 | 101 | 10 000 rupture | 5.6; 5.6; 5.5; 4.6 |
| 10 | 4 | 96 | 5.2; 4.5; 4.8; 4.7 | 90 000 rupture |
| 11 | 4 | 99 | 4.2; 3.8; 3.2; 3.7 | 7.1; 5.6; 6.0; 5.5 |
| 12 | 4 | 102 | 4.2; 3.3; 3.2'; 3.5 | 5.5; 5.8; 6.0; 5.4 |
| 13 | 4 | 104.5 | 3.5; 3.3; 3.8; 3.7 | 4.8; 5.6; 5.0; 5.5 |

In the columns headed cyclic flexure properties, the number before the word "rupture" indicates the number of flexure cycles after which the test specimen ruptured. The other figures give the crack widening in mm; an initial stab of 2 mm is cut into the specimen and after the cyclic flexure test the maximum crack widening including the initial stab must not be more than 6 mm in order for the test to be passed.

The cyclic flexure performance could be significantly improved by means of the polyurethanes produced according to the present invention, both before and after storage under hydrolytic conditions. This advantage could be achieved over a very wide index range, i.e. the ratio of isocyanate groups to isocyanate-reactive groups of component B, so that the processing reliability of the system in the customer's process is significantly improved and fewer complaints have to be feared.

EXAMPLES 14 TO 26

In order to simulate conditions which can occur in the abovementioned specific applications, hot-humid aging was carried out on specimens of the flexible foams specified below. For this purpose, test cubes having an edge length of 3 cm were aged at 90° C. and 90% relative humidity for 72 hours in a temperature- and humidity-controlled cabinet. Under these conditions, hydrolytic cleavage of urethane and urea bonds can occur. This leads not only to a drastic deterioration in the mechanical properties, but also to formation of aromatic amines. For this reason, the content of MDA or TDA was measured in addition to the compressive set, the rebound resilience and the compressive strength on the foams produced, both in the untreated state and after hot-humid aging.

The extraction of the aromatic amines was carried out by means of a method developed by Prof. Skarping, University of Lund. For this purpose, the foam was squeezed out 10 times with 10 ml of acetic acid (w=1% by weight). The acetic acid was, with the foam specimen compressed, transferred to a 50 ml volumetric flask. The procedure is repeated three times and the volumetric flask is made up to the mark with acetic acid. The MDA content of the combined extracts was then determined by means of capillary electrophoresis with UV detection. The MDA contents reported in Tables 2 and 4 correspond to the absolute contents of HDA formed in the PUR foam.

Flexible polyurethane foams were prepared using the following formulation 1, with the additions of acetic anhydrides indicated in Table 4 being added to the isocyanate component (B component) prior to mixing with the polyol component (A component) in the individual examples. For comparison, foams were produced without addition of acid anhydrides.

A component (formulation 1)

- 97 parts by weight of a polyether polyalcohol having a hydroxyl number of 28 mg KOH/g, a mean functionality of 2.3 and prepared using an ethylene oxide to propylene oxide ratio of 14:86,
- 3 parts by weight of a polyether polyalcohol having a hydroxyl number of 42 mg KOH/g, a mean functionality of 3 and prepared using an ethylene oxide to propylene oxide ratio of 30:70,
- 3.31 parts by weight of water,
- 0.8 part by weight of aminopropylimidazole,
- 0.6 part by weight of dimethylaminodiglycol and
- 0.5 part by weight of a stabilizer (Tegostab ® B 8631, Goldschmidt)

B component (formulation 1)

Mixture of a polymeric MDI (proportion by weight = 50%) and a bifunctional MDI mixture (proportion by weight = 50%) having an NCO content of 32.7%.

TABLE 4

Anhydride additions to formulation 1

| Example | Compound (ii), % by weight in B component |
|---|---|
| 14 | Maleic anhydride, 1.0% by weight |
| 15 | Pyromellitic anhydride, 2.0% by weight |
| 16 | Succinic anhydride, 2.0% by weight |
| 17 | Polymaleic anhydride having a mean molecular weight of from 400 to 500, 1.2% by weight |

TABLE 4-continued

Anhydride additions to formulation 1

| Example | Compound (ii), % by weight in B component |
|---|---|
| 18 | Poly(methyl vinyl ether - alternating with - maleic anhydride) having an average molecular weight of 216 000, 0.7% by weight |
| 19 | Glutaric anhydride, 1.9% by weight |
| 20 | Dodecenylsuccinic anhydride, 4.3% by weight |
| 21 | Polytetramethylene ether glycol end-capped with trimellitic anhydride, 2.3% by weight |
| 22 | Maleic anhydride/butadiene copolymer, 5.0% by weight |

The flexible foams were produced by mixing 750 g of A component at room temperature in a 5 l bucket at an index of 100 with 393 g of B component using a stirrer, then, after the cream time had been reached, pouring the foaming mixture into a 40×40×10 cm aluminum mold heated to 53° C., closing the mold and removing the flexible foam after the gel time had been reached.

TABLE 5

MDA contents, formulation 1

| Example | 2,4'-MDA [ppm] | 4,4'-MDA [ppm] |
|---|---|---|
| Comparison w.o.s. | <1 | <1 |
| Comparison wi.s. | 687 | 397 |
| 14 w.o.s. | <1 | <1 |
| 14 wi.s. | 130 | 67 |
| 15 w.o.s. | <1 | <1 |
| 15 wi.s. | 130 | 73 |
| 16 w.o.s. | <1 | <1 |
| 16 wi.s. | 115 | 74 |
| 17 w.o.s. | <1 | <1 |
| 17 wi.s. | 142 | 61 |
| 18 w.o.s. | <1 | <1 |
| 18 wi.s. | 170 | 73 |
| 19 w.o.s. | <1 | <1 |
| 19 wi.s. | 133 | 56 |
| 20 w.o.s. | <1 | <1 |
| 20 wi.s. | 160 | 68 |
| 21 w.o.s. | <1 | <1 |
| 21 wi.s. | 149 | 62 |
| 22 w.o.s. | <1 | <1 |
| 22 wi.s. | 71 | 18 |

In addition, flexible polyurethane foams were produced using the formulation 2 below, with the additions of acid anhydrides indicated in Table 6 being added to the isocyanate component (B component) prior to mixing with the polyol component (A component) in the individual examples. For comparison, foams were produced without addition of acid anhydrides.

A component (formulation 2):

- 97 parts by weight of a polyol having an OHN of 28, a mean functionality of 2.3 and an EO/PO ratio of 14/86
- 3 parts by weight of a polyol having an OHN of 42, a mean functionality of 3 and a PO/EO ratio of 30/70
- 3.31 parts by weight of water,
- 0.22 part by weight of 1,4-diazabicyclo[2.2.2]octane,
- 0.14 part by weight of Lupragen ® N 206 (BASF Aktiengesellschaft), -continued 0.24 part by weight of Kosmos 29,
   0.5 part by weight of Tegostab ® B 8631 (Goldschmidt).
B component (formulation 2):

Lupranat ® T 80 (BASF Aktiengesellschaft)

TABLE 6

Anhydride addition to formulation 2

| Example | Compound (ii), % by weight in B component |
|---|---|
| 23 | Maleic anhydride, 1.0% by weight |
| 24 | Pyromellitic anhydride, 2.0% by weight |
| 25 | Glutaric anhydride, 1.9% by weight |
| 26 | Dodecenylsuccinic anhydride, 4.3% by weight |

TABLE 7

TDA contents, formulation 2

| Example | 2,4-TDA [ppm] | 2,6-TDA [ppm] |
|---|---|---|
| Comparison w.o.s. | <1 | <1 |
| Comparison wi.s. | 28 | 12 |
| 23 w.o.s. | <1 | <1 |
| 23 wi.s. | 4 | 1 |
| 24 w.o.s. | <1 | <1 |
| 24 wi.s. | 3 | 1 |
| 25 w.o.s. | <1 | <1 |
| 25 wi.s. | 4 | 1 |
| 26 w.o.s. | <1 | <1 |
| 26 wi.s. | 3 | <1 |

Discussion of the Results

The advantages of the present invention, i.e. the significantly reduced content of primary aromatic amines after storage under hot and humid conditions achieved by addition of acid anhydrides in polyurethane foams, were able to be convincingly demonstrated by the examples described. After manufacture of the foam, partial hydrolysis of the anhydrides occurs in the presence of moisture to form the corresponding carboxylic acid. These carboxylic acids are in turn capable of deactivating the tertiary amine catalysts used by protonating the catalytically active tertiary nitrogen and thus significantly inhibiting its activity in respect of the cleavage of urethane and urea bonds. As a consequence of the addition of the carboxylic anhydrides used according to the present invention, significantly fewer urethane and urea bonds are cleaved. This shows up not only in significantly smaller amounts of extractable primary amines, but also in a significantly smaller deterioration in the mechanical properties of the foams after hot-humid storage. As the results also show, the test systems display, compared to the two comparative systems, a significantly smaller decrease in the hardness, the tensile strength and the rebound resilience after hot-humid aging. The compressive sets are also significantly lower. The carboxylic anhydrides added are therefore outstandingly suitable as stabilizers against hydrolytic cleavage of urethane and urea bonds and thus against the formation of primary amines in polyurethane products. Furthermore, the anhydrides used according to the present invention are capable of reacting with aromatic amines to form the corresponding carboxamides.

We claim:

1. A process for producing a flexible polyurethane foam for use as mattress, upholstery, or carpet material, said process comprising the steps of:

providing compounds which are reactive toward isocyanates;

providing an isocyanate;

providing at least one organic or inorganic acid anhydride;

mixing the isocyanate and the organic or inorganic acid anhydride outside the presence of the compounds which are reactive toward isocyanates to form a mixture having the acid anhydride in an unreacted state;

reacting the compounds and the mixture in the presence of at least one urethane forming catalyst selected from the group consisting of organic amines and organic metal compounds such that the acid anhydride remains in the unreacted state throughout the reaction of the compounds and the mixture to form the flexible polyurethane foam; and wherein the flexible polyurethane foam has a density of from 20 to 70 kg/m$^3$ with the acid anhydride in the unreacted state capable of being hydrolyzed to prevent deterioration of the flexible polyurethane foam when exposed to hot or humid conditions.

2. A process as claimed in claim 1 further comprising the step of providing the acid anhydride in an amount of from 0.01 to 20% by weight, based on the weight of the mixture.

3. A process as claimed in claim 1 further comprising the step of providing the acid anhydride based on one of pyromellitic acid, citraconic acid, itaconic acid, phthalic, isophthalic and/or terephthalic acid, benzonic acid, phenylacetic acid, cyclohexylalkanoic acid, malonic acid, adducts of maleic acid with styrene and/or of maleic acid and alkylenes, succinic acid, maleic acid, polymaleic acid, and glutaric acid.

4. A process as claimed in claim 1 further comprising the step of providing the acid anhydride as a copolymer of one of pyromellitic acid, citraconic acid, itaconic acid, phthalic, isophthalic and/or terephthalic acid, benzonic acid, phenylacetic acid, cyclohexylalkanoic acid, malonic acid, succinic acid, maleic acid, polymaleic acid, and glutaric acid with comonomers which are copolymerizable with these acids.

5. A process as claimed in claim 1 wherein the acid anhydride comprises alicyclic carboxylic acid compounds.

6. A process as claimed in claim 5 wherein the alicyclic carboxylic acid compounds are selected from at least one of pyromellitic acid, phthalic acid, isophthalic acid, terephthalic acid, benzonic acid, phenylacetic acid, and cyclohexylalkanoic acid.

7. A process as claimed in claim 1 wherein the acid anhydride comprises aliphatic carboxylic acid compounds.

8. A process as claimed in claim 7 wherein the aliphatic carboxylic acid compounds are selected from at least one of citraconic acid, itaconic acid, malonic acid, adducts of maleic acid with styrene and/or of maleic acid and alkylenes, succinic acid, maleic acid, polymaleic acid, and glutaric acid.

* * * * *